United States Patent
Fischer et al.

(10) Patent No.: US 6,538,130 B1
(45) Date of Patent: Mar. 25, 2003

(54) MANUFACTURE OF VISCOSE AND OF ARTICLES THEREFROM

(75) Inventors: Klaus Fischer, Grillenburg (DE); Heinzhorst Möbius, Saal (DE); Tatjana Poggi, Saal (DE)

(73) Assignee: Acordis Kelheim GmbH, Kelheim (DE)

( * ) Notice: Subject to any disclaimer, the term of this patent is extended or adjusted under 35 U.S.C. 154(b) by 0 days.

(21) Appl. No.: 09/509,036

(22) PCT Filed: Sep. 22, 1998

(86) PCT No.: PCT/GB98/02857

§ 371 (c)(1), (2), (4) Date: Mar. 21, 2000

(87) PCT Pub. No.: WO99/15565

PCT Pub. Date: Apr. 1, 1999

(30) Foreign Application Priority Data

Sep. 23, 1997 (GB) ............................................. 9720213

(51) Int. Cl.[7] ............................ C07H 1/00; C08B 9/00; A61F 13/15
(52) U.S. Cl. .......................... 536/124; 536/60; 536/61; 604/374
(58) Field of Search ........................... 536/124, 60, 61; 604/374

(56) References Cited

U.S. PATENT DOCUMENTS

| 3,539,678 A | * 11/1970 | Uchida et al. | |
| 3,728,330 A | 4/1973 | Sihtola et al. | 260/217 |
| 3,839,074 A | 10/1974 | Taylor | 428/510 |
| 5,358,679 A | 10/1994 | Parekh et al. | 264/177.13 |
| 5,458,835 A | 10/1995 | Wilkes et al. | 264/143 |
| 5,634,914 A | 6/1997 | Wilkes et al. | 604/375 |
| 5,750,446 A | 5/1998 | Nguyen et al. | 442/337 |

FOREIGN PATENT DOCUMENTS

| CH | 152248 | 4/1932 |
| DE | 2941624 | 10/1979 |
| EP | 301 874 | 6/1992 |
| GB | 1256790 | 12/1971 |
| SU | 1669916 | 7/1988 |
| WO | WO 97/33918 | 9/1997 |

OTHER PUBLICATIONS

G. Hidasi, et al., "Manufacture of Viscose and of Articles Therefrom", U.S. patent application No. 09/142,545 filed Sep. 24, 1998.
Patent Abstracts of Japan, vol. 10, No. 31 (C–327), Feb. 6, 1986 & JP 60 181312 A (Daiwa Bouseki) Sep. 17, 1985.
Database WPI, Week 7825, Derwent Publications Ltd., London, GB; AN 22840 A XP 002089131 & JP 53 014826 A (Daiwa Spinning), Feb. 9, 1978 & Chemical Abstracts, vol. 88, No. 26, Jun. 26, 1978, Columbus, Ohio; Abstract No. 192638.
Database WPI, Week 8551, Derwent Publications Ltd., London, GB; AN 322004 XP 002089132 & SU 1,159,925 A (Serkov), Jun. 7, 1985 & Chemical Abstracts, vol. 103, No. 18, Nov. 4, 1985, Columbus, Ohio, Abstract No. 143610.
Database WPI, Week 9229, Derwent Publications Ltd., London, GB; AN 240338 XP002032719 & SU 1,669,916 (Stavtsov A K), Aug. 15, 1991.

* cited by examiner

Primary Examiner—James O. Wilson
Assistant Examiner—Everett White
(74) Attorney, Agent, or Firm—Howson and Howson

(57) ABSTRACT

In the manufacture of viscose, and an elongate cellulose member such as standard viscose rayon fibre, with reduced alkali ratio from dissolving-grade cellulose such as wood pulp by irradiation with a high energy beam at a dose of 1–30 kGy, steeping in aqueous sodium hydroxide, pressing to form alkali cellulose, xanthating to form cellulose xanthate, dissolving in aqueous liquor to form viscose and (when elongate cellulose members are required) extruding through a die into an acid bath for coagulation and regeneration to form an elongate cellulose member which is then washed and dried, viscose filtration can be improved by including in the dissolving liquor for the cellulose xanthate an amount of from 200 to 10000 ppm by weight of a salt which consists of alkali metal or ammonium cations and anions of a strong acid.

11 Claims, No Drawings

MANUFACTURE OF VISCOSE AND OF ARTICLES THEREFROM

FIELD OF THE INVENTION

This invention relates to the manufacture of viscose and of articles therefrom, particularly elongate members such as fibres and films.

BACKGROUND ART

The viscose process has been known for many years and is described for example in K. Goetze, Chemiefasern nach dem Viskoseverfahren, Scringer-Verlag, 3rd edition (1967) with considerable detail and in an article entitled "Cellulose" in Ullmann's Encyclopaedia of Industrial Chemistry, VCH Publishing, 5th edition, Volume A5 (1986) (in more general terms).

The conventional steps of the viscose process may be briefly summarised as follows. Dissolving-grade woodpulp (or some other suitable source of cellulose) is steeped in aqueous sodium hydroxide. Excess liquor is removed by pressing to yield alkali cellulose. The alkali cellulose is usually preripened in air for some hours in order to allow oxidative degradation to occur, thereby reducing the degree of polymerisation of the cellulose chains. The alkali cellulose is reacted with carbon disulphide (xanthated) to form cellulose xanchate, which is then dissolved in an aqueous liquor (dilute aqueous sodium hydroxide or water) to form the solution called viscose. The viscose is ripened by storage at or around ambient temperature for some hours, during which time chemical changes, including redistribution of xanthate groups, take place. Other operations, including filtration and deaeration, are also performed on the viscose during this time. In the manufacture of elongate members such as fibres and films, the ripened viscose is then extruded through a die into an aqueous acid bath (usually based on sulphuric acid), where it coagulates, and cellulose is regenerated from the cellulose xanthate. The extrusion process is commonly called spinning in fibre manufacture and casting in film manufacture. The regenerated elongate cellulose member is then washed free of impurities and dried.

In the viscose art, it is customary to express the carbon disulphide content of viscose in terms of the weight of carbon disulphide introduced into the xanthation step as a percentage of the weight of cellulose in the alkali cellulose (% $CS_2$ on CiA). This is sometimes (with less accuracy) referred to as the $CS_2$ content based on the cellulose in the viscose (% $CS_2$ on CiV). The percentage of cellulose in alkali cellulose (% CiA) may be assessed gravimetrically by acidification, washing with water and drying. The Percentage of cellulose in viscose (% CiV) may be assessed gravimetrically by regeneration in sulphuric acid, washing with water and drying. The alkalinity of alkali cellulose and of viscose (% SiA and % SiV respectively) may be assessed titrimetrically by a back-titration, in which the material to be analysed is first acidified with a known amount of sulphuric acid and the residual sulphuric acid is then estimated by titration against sodium hydroxide. Alkalinities measured in this manner are usually reported in terms of the corresponding weight percentage of sodium hydroxide. The weight ratio of alkali to cellulose in viscose is commonly called the soda/cellulose ratio or alkali ratio.

Viscose can be used for the manufacture both of standard (regular, conventional) viscose fibre and of a variety of specialised types such as industrial yard and modal fibres (including polynosic and HWM types), all such fibres being classed generically as viscose rayons. It can also be used for the manufacture of cellulose films and of articles such as food casings and teabags. Such specialised fibres generally demand the use of specialised viscoses, but the other products are generally made using standard (regular, conventional) viscose. In general, the recipes used in the manufacture of standard viscose reflect the desire to minimise costs while maintaining adequate product properties, whereas those used in the manufacture of the specialised types reflect the predominant desire to obtain specific product properties, cost being of secondary importance. It is well-known that product properties are controlled inter alia by viscose parameters at extrusion, including its cellulose content, alkali content, viscosity and degree of ripeness (degree of xanthate substitution, gamma value), and by bath parameters such as sulphuric acid content, sodium sulphate content, zinc sulphate content and temperature. These and other parameters are interdependent, and alteration of one may require alteration to one or more of the others if product properties are to be mainzained or optimised.

Efforts have been made over the years to reduce the cost of the viscose process by reducing the quantities of consumable chemicals, including carbon disulphide, sodium hydroxide and sulphuric acid, used therein. As well as the effects on product properties hereinbefore mentioned, it is well-known that the filterability of viscose is affected by (inter alia) the alkalinity of the alkali cellulose and the dissolving liquor and the amount of carbon disulphide used. It is well-known that filterability varies with the amount of carbon disulohide introduced into the xanthation step. The minimum acceptable amount for industrial-scale operation has reduced over the years from about 30–35% or more to about 25–30% $CS_2$ on CiA, consequent upon progressive improvements in woodpulp quality, equipment design, the use of chemical additives, and so forth. Similarly, it is well-known that, if the soda/cellulose ratio is permitted to fall below a certain value, then viscose filterability will be adversely affected. It has been suggested that the optimum soda/cellulose ratio is about 0.83, and indeed ratios of this order are used in the manufacture of some of the specialised types of fibre. In the manufacture of standard viscose, the minimum soda/cellulose ratio usable in industrial-scale operation has been found to be about 0.55, a value little changed over a number of years.

It is also well-known that viscose quality ,i.e. filterability) varies with the amount of hemicellulose present during key steps of its manufacture, notably steeping, xanthation and dissolving improved results can be obtained if pure caustic soda is used in the steeping and dissolving steps or if efforts are made to remove hemicellulose from the alkali cellulose before xantharion. Use of pure chemicals may be practical in the laboratory but not in the factory. Processes such as the "double-steeping" or SINI technique described in GB-A-1, 256,790 which serve to remove hemicellulose from preripened alkali cellulose have failed to gain commercial acceptance. A considerable proportion of the hemicellulose dissolved during steeping can be incorporated into satisfactory products, e.g. by inclusion in the dissolving liquor, and it would be both commercially and environmentally unsound to discard this material.

DE-A-2,941,624 describes a process for the manufacture of viscose from woodpulp, wherein the woodpulp is irradiated with a dose of high-energy electrons amounting to 1–30 kGy prior to the steeping step and is then steeped in a solution containing less than 19 percent, preferably around 16 percent, by weight sodium hydroxide. This is said to have a number of advantages over conventional processes. The concentration of sodium hydroxide used in the steeping step can be reduced, with the result that savings can be made in sodium hydroxide, carbon distilohide and sulphuric acid consumption. A consequence of reduced carbon disulohide use is reduced environmental pollution arising from carbon disulphide and hydrogen sulphide liberated during regeneration and washing. With a suitably-chosen degree of irradiation, the preripening step can be omitted. Examples are given of the preparation of viscoses of good filterability using between 24 and 28 percent $CS_2$ on CiV, the product containing 8 percent by weight cellulose and 5.3 or 5.8 percent by weight alkali (soda/cellulose ratio 0.66 or 0.73). SU-A-1,669,916 describes the use of lesser amounts of $CS_2$ in such a process. Examples are given of the preparation of viscoses of satisfactory filterability using 9.3 to 23.10% $CS_2$ on CiA and containing 8.4 percent by weight cellulose and 6.4 percent by weight alkali (soda/cellulose ratio 0.76).

Copending international patent application PCT/GB97/00646 (publication No. WO 97/33918) in the name of Hoechst AG describes a process for the manufacture of viscose from irradiated woodpulp, in which the alkali ratio of the viscose is in the range from 0.35 to 0.50, preferably from 0.37 to 0.45. This process permits marked reductions in the consumption of sodium hydroxide and sulphuric acid in comparison with the process described in DE-A-2,941,624. Nevertheless, operation on the commercial scale of the process described in PCT/GB97/00646 has been attended by unexpected difficulties, as will now be explained.

The viscosity of viscose is commonly measured and reported under low-shear conditions, conveniently by the falling-ball method. The low-shear viscosity of viscose used in the manufacture of fibre and film is typically in the range from 3 to 20 mPa.s (30–200 poise). Viscose is a pseudoplastic liquid. Accordingly, the apparent viscosity of viscose decreases along a sigmoid curve as shear rate is increased. The apparent viscosity of almost all viscoses under the high-shear conditions experienced during extrusion through a die is of the order of 0.1 to 0.2 mPa.s (1–2 poise) or less. A viscose which exhibits a relatively high viscosity under low shear does not necessarily exhibit a relatively high viscosity under high shear.

It has now been found that viscose prepared according to PCT/GB97/00646 which has similar falling ball viscosity, extrusion behaviour, filterability and undissolved particle content to a conventional viscose, may nevertheless be more difficult to filter on the factory scale than such a conventional viscose. This difficulty in filtration manifests itself through increased pressure drop across filters, with the consequences that factory throughput and filter life may be reduced and that losses of viscose consequent upon filter changing or cleaning may be increased. It is an object of the invention to alleviate such filtration problems.

DISCLOSURE OF THE INVENTION

According to the invention, there is provided a method for the manufacture of viscose which comprises the steps of:

(a) irradiating dissolving-grade cellulose with a high-energy beam at a dose of 1–30 kGy, preferably 7–23 kGy;

(b) steeping the irradiated cellulose in aqueous sodium hydroxide;

(c) pressing the steeped irradiated cellulose to form alkali cellulose;

(d) xanthating the alkali cellulose to form cellulose xanthate; and (e) dissolving the cellulose xanthate in an aqueous liquor to form viscose, characterised in that the aqueous liquor used in step (e) contains in solution from 200 to 10000, preferably from 200 to 2000, parts per million by weight of a salt which consists of alkali metal cations or ammonium cations and anions of a strong acid.

The alkali ratio of the viscose is preferably within the range from 0.35 to 0.50, more preferably from 0.37 to 0.45.

According to the invention, there is further provided a method for the manufacture of an elongate cellulose member which comprises the steps of:

(a) irradiating dissolving-grade cellulose with a high-energy beam at a dose of 1–30 kGy, preferable 7–23 kGy;

(b) steeping the irradiated cellulose in aqueous sodium hydroxide;

(c) pressing the steeped irradiated cellulose to form alkali cellulose;

(d) xanthatina the alkali cellulose to form cell-lose xanthate;

(e) dissolving the cellulose xanthate in an aqueous liquor to form viscose;

(f) extruding the viscose through a die into an acid bath where the viscose is coagulated and regenerated to form an elongate cellulose member; and (g) washing and drying the elongate cellulose member, characterised in that the aqueous liquor used in step (e) contains in solution from 200 to 10000, preferably from 200 to 2000, parts per million by weight of a salt which consists of alkali metal cations or ammonium cations and anions of a strong acid. The elongate member may take the form of fibre or film.

The cation is preferably sodium. Examples of anions of strong acids suitable for use in the invention include anions of strong inorganic acids, for example monovalent anions such as chloride and divalent anions such as sulphate. The salt is preferably sodium sulphate, because this is a byproduct produced when viscose is coagulated and regenerated in conventional sulphuric acid baths. Accordingly, supplies of sodium sulphate are readily available in viscose factories, and the presence of a small proportion of sodium sulphate in the viscose will have little or no impact on overall operation. Furthermore, the presence of sodium sulphate in viscose is unlikely to cause any problems of corrosion. Sodium chloride is another cheap and readily-available salt which may also be used. Higher concentrations of the salt than 10000 ppm (1%) by weight may also be used.

Without our wishing to be bound by any theory, it is thought that viscose of low alkali ratio as disclosed in PCT/GB97/00646 may exhibit an anomalously high apparent viscosity at shear rates intermediate between chose prevailing in falling-ball viscosity measurement and those prevailing during extrusion through a die. Viscose is commonly subjected to such intermediate shear rates during passage through filters. If this is true, it would serve to explain the aforementioned increased pressure drop across filters. It is thought that this anomalously high apparent viscosity may be connected with the relatively low ionic strength of the viscoses of relatively low soda/cellulose ratio disclosed in PCT/GB97/00646. This relatively low ionic strength may have the effect that the cellulose chains in the viscose solution adopt a relatively extended conformation and in consequence are relatively more entangled than in conventional viscose. It is thought that use of a dissolving liquor containing a salt according to the methods of the invention may tend to cause the cellulose chains to adopt a coiled conformation, with the result that chain entanglement is reduced towards the levels observed in conventional viscose. Whether or not this explanation is correct, it was surprising to observe that use of a dissolving liquor containing only a small proportion of a salt could have a marked effect towards alleviating the problems addressed by the invention.

The source of cellulose used as starting material is preferably woodpulp, which may be hardwood or softwood, produced by conventional processes such as the sulphate or sulphite processes. It usually contains at least 85 percent, often 90 to 98 percent, by weight alpha-cellulose. Other sources of dissolving-grade cellulose may also be used. Irradiation is effected using ionising radiation, preferably an electron beam, although other energy sources such as gamma rays may also be used. The energy of the irradiation source is preferably in the range from 0.25 to 30 MeV. More preferably, the energy of the irradiation source is in the range from 0.25 to 10 MeV, in which case irradiation is preferably carried out on a single layer of woodpulp in roll or sheet form. If the energy of the source is towards the higher end of the wider range, irradiation may be performed using an isodose technique, that is to say on a stack of sheets of woodpulp of such a thickness that the dosage to which the surfaces nearer to and more remote from the source of radiation are subjected is of comparable magnitude, for example about 5 cm thick. Secondary electrons generated inside the woodpulp stack serve to increase the dosage to which the more remote parts of the stack are subjected. Irradiation may conveniently be performed during pulp manufacture or immediately prior to steeping.

Steeping may be performed in any conventional manner, for example sheet steeping or slurry steeping, at a temperature appropriate for the chosen process. The steeping liquor typically comprises 14 to 20, often 15 to 17, percent by weight sodium hydroxide and 0.1 to 5, often 0.5 to 3.0, percent by weight hemicellulose (i.e. dissolved oxidisable material including beta—and gamma-celluloses, which can be assessed by dichromate oxidation). The concentration of sodium hydroxide in the steeping liquor in the methods of the invention may advantageously be somewhat lower, for example 1 to 2 percent lower, than with non-irradiated woodpulp. The alkali cellulose preferably comprises 28 to 38, further preferably 32 to 35, percent by weight cellulose and 13 to 16 percent by weight alkali (expressed as NaOH).

The alkali cellulose may be preripened before xanthation if desired; however, no preripening step is required if the appropriate radiation dose is used. Accordingly, there is in general no need to include a preripening catalyst in the steeping liquor. The decree of polvmerisation (D.P.) of the cellulose introduced into the xanthation step is preferably in the range 200 to 500, more preferably 250 to 450. The degree of polymerisation (D.P.) of cellulose is conveniently assessed by viscosimetry of a dilute solution of cellulose in an aqueous metal amine complex solvent, for example cuprammonium hydroxide solution. A suitable method, based on TAPPI Standard T206, is described hereinafter as Test Method 1. Cellulose D.P. is a measure of the number of anhydroglucose units per molecule. It will be understood that D.P. measured in this manner is a viscosity-average D.P. The xanchation step may be performed batchwise or continuously, in any conventional manner. The amount of carbon disulphide introduced in-o the xanthation step may be in the range 15 to 30%, preferably 15 to 25%, by weight on CiA. Use of reduced levels of $CS_2$ in the methods of the invention is advantageous not only in cost terms but also in that it may be found that a lower proportion of the added $CS_2$ is converted into $H_2S$-generating byproducts.

The aqueous dissolving liquor typically comprises 0 to 3.0, often 0.5 to 2.5, percent by weight sodium hydroxide. The dissolving liquor may be water. It may also contain 0 to 1.0, often 0.1 to 1.0, percent by weight dissolved cellulosic material, originating from hemicellulose dissolved in the steeping liquor (which is in common practice diluted to produce the dissolving liquor) and/or from recycled viscose (e.g. recovered from filters). The viscose typically contains 7 to 11, preferably 8 to 10, percent by weight cellulose. It has surprisingly been found that good quality viscose can be made using both 15–25% $CS_2$ on CiA and a soda/cellulose ratio of 0.35–0.50.

It is common practice to extract a proportion of the liquor from the steeping circuit and dilute it to provide the dissolving liquor. It will be appreciated that the dissolving liquor used in the methods of the invention to provide viscose of low alkali ratio in general contains a lower concentration of sodium hydroxide than that used in conventional methods and that accordingly a lower proportion of steeping liquor may require to be extracted. The equilibrium concentration of hemicellulose in the steeping liquor may therefore tend to be higher when the methods of the invention are used than is the case with conventional methods. It may therefore be desirable to remove hemicellulose from the steeping liquor circuit in order to prevent its concentration from rising to an undesirably high equilibrium value. Techniques for removal of excess hemicellulose from steeping liquors are known and include dialysis and reverse osmosis.

Viscose prepared by the method of the invention may additionally comprise conventional additives, for example surfactants which assist in the steeping, xanchation and dissolving steps, and viscose additives such as poly(alkylene glycols) and amines which serve as spinning modifiers.

It is generally necessary to store viscose before regeneration until it has achieved a desired degree of ripeness (which may be assessed by techniques such as salt figure, Hottenroth number and gamma-value measurement). It will be appreciated that use of a relatively low amount of $CS_2$ results in a relatively low initial gamma-value, so that it may be necessary carefully to control ripening time and temperature in order to avoid overripening. The method of the invention thereby allows ripening time to be minimised. If desired, liquid $CS_2$ can be injected into the viscose shortly before extrusion in order to raise its gamma-value. This procedure has the advantage that $CS_2$ introduced in this way reacts with cellulose with a high degree of efficiency and with low byproduct formation, so that the overall consumption of $CS_2$ is less than in conventional practice. The liquid $CS_2$ is preferably mixed into the viscose by means of a barrel or suchlike mixer. The amount of $CS_2$ thereby injected may be in the range 0.1 to 2.0% by weight on CiV.

Viscose prepared by the method of the invention can be handled and subjected to conventional processing operations such as filtration and deaeration in conventional manner and spun or cast on conventional equipment. It may be found desirable to reduce the acidity of the regeneration bath to compensate for the reduced alkalinity of viscose made by the method of the invention compared with conventional viscoses, but in general it has surprisingly been found that little alteration is necessary to standard spinning conditions in order to produce satisfactory products. Typical standard spinbaths for the manufacture of standard fibre comprise 7 to 12 percent by weight sulphuric acid, 0.5 to 3 percent by weight zinc sulphate and 12 to 30, often 20 to 30, percent by weight sodium sulphate; typical casting baths for the manufacture of film are similar, but with the omission of zinc sulphate. The extruded elongate member may be washed, finished, dried and collected in conventional manner.

Test Method 1—Measurement of Cuorammonium Solution Viscosity and D.P.

This test is based on TAPPI Standard T206 os-63. Cellulose is dissolved in cuprammonium hydroxide solution containing 15±0.1 g/l copper and 200±5 g/l ammonia, with nitrous acid content <0.5 g/l, (Shirley Institute standard) to give a solution of accurately-known cellulose concentration (about 1%). Solution flow time through a Shirley viscometer at 20° C. is measured, from which viscosity may be calculated in standard manner. Viscosity-average D.P. is determined using the empirical equation:

$$D.P.=412.4285 \ln [100(t-k/t)/n.C]-348$$

where t is flow time in seconds, k is the gravity constant, C is the tube constant, and n is the density of water in g/ml at the temperature of the test (0.9982 at 20° C.).

The invention is illustrated by the following Examples, in which parts and proportions are by weight unless otherwise specified.

EXAMPLE

Dissolving-grade woodpulp was irradiated using a 10 MeV electron beam and a dosage of 14 kGy to give viscosity 5.9 mpa.s. 300 g samples of irradiated woodpulp were slurry-steeped and the slurry pressed by centrifuging to yield alkali cellulose (32–330% cellulose, 14.5–5.5% NaOH). The steeping liquor contained 200 g/l sodium hydroxide and 25 g/l hemicellulose; its temperature was 400° C.

In a comparative experiment, a sample of non-irradiated woodpulp was steeped and centrifuged as described above and preripened to give viscosity 4.8 mPa.s.

In each case, the resulting alkali cellulose was xanthated and dissolved in dilute sodium hydroxide to yield viscose. In experiments according to the invention, the dissolving liquor additionally contained a small proportion of sodium chloride.

The filterability (Kw) of the viscoses was determined in conventional manner by filtration at constant pressure (200 kPa) through three layers of cambric filtercloth. Viscose throughput was measured at 10-minute intervals over 1 hour. Kw was estimated by extrapolation to complete plugging, lower values corresponding to better filterability. It is well-known that Kw measured in this manner is influenced by the low-shear viscosity of the viscose. All other things being equal, Kw measured on a low-viscosity viscose is lower than Kw measured on a high-viscosity viscose.

Data from the filterability measurements and other details of the experiments are presented in Table 1. Sample A is a conventional viscose made from non-irradiated woodpulp; samples B1 and B2 are viscoses made from irradiated woodpulp in accordance with PCT/GB97/00646; and samples C1 and C2 are viscoses made in accordance with the present invention. Samples B1 and C1 were made and tested in parallel, as were (in a separate experiment) samples B2 and C2.

TABLE 1

| Sample | A | B1 | B2 | C1 | C2 |
| --- | --- | --- | --- | --- | --- |
| CiV % | 8.93 | 9.11 | 9.16 | 9.11 | 9.15 |
| SiV % | 4.97 | 4.04 | 4.10 | 4.02 | 4.05 |
| A.R. | 0.55 | 0.44 | 0.44 | 0.44 | 0.44 |

TABLE 1-continued

| Sample | A | B1 | B2 | C1 | C2 |
| --- | --- | --- | --- | --- | --- |
| $CS_1$ CiA | 32 | 24 | 24 | 24 | 24 |
| NaCl mg/kg in viscose | 0 | 0 | 0 | 800 | 800 |
| B.F. sec | 30 | 49 | 38 | 48 | 43 |
| ° Hott | 6.8 | 4.1 | 4.3 | 3.8 | 3.7 |
| C.C. | 7620 | 3530 | 3230 | 2870 | 2600 |
| Kw | 173 | 209 | 275 | 140 | 118 |
| Throughput ml after: | | | | | |
| 10 min | 289 | 227 | 237 | 272 | 292 |
| 20 min | 443 | 350 | 370 | 480 | 509 |
| 30 min | 543 | 461 | 483 | 553 | 620 |
| 40 min | 627 | 537 | 562 | 638 | 701 |
| 50 min | 694 | 580 | 615 | 711 | 820 |
| 60 min | 738 | 593 | 624 | 794 | 914 |

A.R. stands for alkali ratio (SiV % divided by CiV %). B.F. represents viscose viscosity measured by the falling-ball method at 30° C. °Hott represents the ripeness of freshly-made viscose measured by the Hottenroth method using 150% ammonium chloride. C.C. represents undissolved particles >8 micrometre in diameter per ml viscose measured using a Coulter Counter (Trade Mark of Coulter Electronics Limited) on samples consisting of 1 part viscose and 4 parts highly-filtered 6% sodium hydroxide solution.

The filterability of all the viscoses was very good. The particle content of samples B1, B2, C1 and C2 (irradiated woodpulp) was lower than that of sample A (non-irradiated woodpulp). Furthermore, the filterability and particle content of samples C1 and C2 (with NaCl) were lower than those of samples B1 and B2 (without NaCl).

The flowrate of samples C1 and C2 (with NaCl) through the filter pack was markedly more rapid than that of samples B1 and B2 (without NaCl). It will be appreciated that the most significant comparison is between throughputs in the early stages of Kw measurement, because flowrate decreases as the filter pack becomes progressively more plugged.

What is claimed is:

1. A method for the manufacture of viscose which comprises the steps of:
    (a) irradiating dissolving-grade cellulose with a high-energy beam at a dose of 1–30 kGy,
    (b) steeping the irradiated cellulose in aqueous sodium hydroxide;
    (c) pressing the steeped irradiated cellulose to form alkali cellulose;
    (d) xanthating the alkali cellulose to form cellulose xanthate; and
    (e) dissolving the cellulose xanthate in an aqueous liquor to form viscose,
wherein the aqueous liquor used in step (e) contains in solution from 200 to 2000 parts per million by weight of a salt which consists of a cation selected from the group consisting of alkali metal cations and ammonium cations, and an anion of a strong acid.

2. The method according to claim 1, wherein the alkali to cellulose ratio of the viscose is within the range from 0.35 to 0.50.

3. The method according to claim 2, wherein the alkali to cellulose ratio of the viscose is within the range from 0.37 to 0.45.

4. The method according to claim 1, wherein the salt is selected from the group consisting of sodium chloride and sodium sulphate.

5. The method according to claim 1, wherein the energy of the high-energy beam is in the range from 0.25 to 10 MeV.

6. The method according to claim 1, wherein the aqueous sodium hydroxide solution introduced into the steeping step (b) has a hemicellulose content in the range from 0.1 to 5 percent by weight.

7. The method according to claim 6, wherein said hemicellulose content range is from 0.5 to 3 percent by weight.

8. The method according to claim 1, wherein the amount of carbon disulphide introduced into the xanthation step (d) is in the range from 15 to 25 percent by weight based on the weight of cellulose in the alkali cellulose.

9. The method according to claim 1, wherein the viscose has a cellulose content in the range from 7 to 11 percent by weight.

10. The method according to claim 9, wherein said cellulose content range is from 8 to 10 percent by weight.

11. The method according to claim 1, wherein said high-energy beam is at a dose of 7–23 kGy.

* * * * *

UNITED STATES PATENT AND TRADEMARK OFFICE
CERTIFICATE OF CORRECTION

PATENT NO. : 6,538,130 B1
DATED : March 25, 2003
INVENTOR(S) : Fischer et al.

It is certified that error appears in the above-identified patent and that said Letters Patent is hereby corrected as shown below:

Column 1,
Line 13, replace "Scringer" with -- Springer --.
Line 51, replace "Percentage" with -- percentage --.

Column 2,
Line 30, replace "disulohide" with -- disulphide --.
Line 51, replace "xantharion" with -- xanthation --.

Column 3,
Line 3, replace "distilohide" with -- disulphide --.
Line 4, replace "disulohide" with -- disulphide --.
Line 14, replace "23.10%" with -- 23.1% --.

Column 4,
Line 12, replace "preferable" with -- preferably --.
Line 51, replace "chose" with -- those --.

Column 5,
Line 49, replace "decree of polvmerization" with -- degree of polymerization --.
Line 60, replace "xanchation" with -- xanthation --.

Column 6,
Line 32, replace "xanchatioin" with -- xanthation --.

Column 7,
Line 3, replace "Cuorammonium" with -- Cuprammonium --.
Line 27, replace "mpa.s." with -- mPa.s. --.
Line 29, replace "330%" with -- 33% --.
Line 29, replace "5.5%" with -- 15.5% --.
Line 31, replace "400ºC" with -- 40ºC --.

UNITED STATES PATENT AND TRADEMARK OFFICE
CERTIFICATE OF CORRECTION

PATENT NO. : 6,538,130 B1
DATED : March 25, 2003
INVENTOR(S) : Fisher et al.

It is certified that error appears in the above-identified patent and that said Letters Patent is hereby corrected as shown below:

Column 8,
Table 1, Line 5, replace "CS $_1$" with -- $CS_2$ --.
Line 22, replace "150%" with -- 15% --.

Signed and Sealed this

Twentieth Day of January, 2004

JON W. DUDAS
*Acting Director of the United States Patent and Trademark Office*